United States Patent [19]
Kaji et al.

[11] Patent Number: 5,609,898
[45] Date of Patent: Mar. 11, 1997

[54] CALCIUM-ENRICHED DRINK AND METHOD FOR PRODUCING THE SAME

[75] Inventors: Nobuo Kaji; Susumu Mizusawa; Masayuki Sahashi; Takako Tsuchida, all of Tokyo, Japan

[73] Assignee: Kabushiki Kaisha Yakult Honsha, Tokyo, Japan

[21] Appl. No.: 567,240

[22] Filed: Dec. 5, 1995

[30] Foreign Application Priority Data

Dec. 7, 1994 [JP] Japan .................................... 6-330348

[51] Int. Cl.$^6$ ............................ A23L 1/0534; A23L 1/304
[52] U.S. Cl. .......................... 426/74; 426/519; 426/522; 426/573; 426/575; 426/580; 426/634
[58] Field of Search .................................. 426/580, 575, 426/634, 74, 573, 522, 519

[56] References Cited

U.S. PATENT DOCUMENTS

| | | | |
|---|---|---|---|
| Re. 26,199 | 5/1967 | Leo et al. .................................. | 426/575 |
| 4,389,425 | 6/1983 | Burr, II ..................................... | 426/634 |
| 5,063,074 | 11/1991 | Kahn et al. . | |
| 5,175,015 | 12/1992 | Kahn et al. ............................. | 426/575 |

FOREIGN PATENT DOCUMENTS

| | | |
|---|---|---|
| 0235971 | 9/1987 | European Pat. Off. . |
| 0570252 | 11/1993 | European Pat. Off. . |
| 5032009 | 1/1986 | Japan . |
| 6335365 | 12/1994 | Japan . |
| 2180733 | 4/1987 | United Kingdom . |

*Primary Examiner*—Helen Pratt
*Attorney, Agent, or Firm*—Sughrue, Mion, Zinn, Macpeak & Seas

[57] ABSTRACT

The present invention provides a soybean milk or milk drink which is highly enriched with calcium and which has excellent taste and storage stability. The soybean milk or milk drink is enriched with calcium by adding a hardly soluble calcium compound thereto, and by adding colloidal microcrystalline cellulose and low-strength agar in such amounts as not to exceed a viscosity of 40 cp, to thereby stabilize the calcium in the soybean milk or milk drink.

14 Claims, No Drawings

CALCIUM-ENRICHED DRINK AND METHOD FOR PRODUCING THE SAME

FIELD OF THE INVENTION

This invention relates to a drink which is highly enriched with calcium. More particularly, it relates to a calcium-enriched soybean milk drink and a calcium-enriched milk drink.

Unless otherwise noted, the term "soybean milk drink" as used herein means a drink produced from soybean milk and/or soybean protein powder, while the term "milk drink" as used herein means a drink produced from cow's milk.

BACKGROUND OF THE INVENTION

Calcium-enriched drinks, i.e., drinks containing edible calcium compounds, are desirable as daily drinks to increase the calcium content of the Japanese, which tend to be calcium deficient.

A known method for elevating the calcium content of a soybean milk drink comprises adding a water soluble calcium salt, such as calcium malate (JP-A-60-47635; the term "JP-A" as used herein means an "unexamined published Japanese patent application"). However, according to this method, when a soybean milk drink containing a large amount of the water soluble calcium salt is thermally sterilized, it becomes cloudy due to the coagulation of proteins, which restricts the sterilization method and the amount of the calcium salt that can be added.

JP-A-52-90662 proposes a method for preventing the coagulation of proteins, which comprises mixing slaked lime with soybean milk, eliminating the solid matters and then treating the residue successively with an acid and an alkali. However, the disadvantage of this method is that it results in large losses due to the treatments and requires a complicated procedure. Although JP-B-2-8689 proposes a method which comprises adding a complex of slaked lime with a saccharide to soybean milk and regulating the pH value with an organic acid, this method requires a complicated procedure and achieves only a small increase in calcium content, i.e., about 0.1% (the term "JP-B" as used herein means an "examined Japanese patent publication").

Also, a method is known which comprises adding a hardly soluble calcium salt, such as calcium lactate, to microcrystalline cellulose (JP-B-5-32009). However, this method suffers from the problem that proteins coagulate at the final step of heat sterilization and thus, an additional homogenization step is required thereafter.

The troubles encountered in these cases apply not only to soybean milk drinks, but also to general milk drinks that are enriched with high amounts of calcium.

SUMMARY OF THE INVENTION

Under these circumstances, an object of the present invention is to provide a means for easily enriching a soybean milk drink with calcium.

Another object of the present invention is to provide a soybean milk drink which is highly enriched with calcium and has excellent taste and storage stability.

Another object of the present invention is to provide a convenient method for enriching a milk drink with calcium and a milk drink which is highly enriched with calcium.

The calcium-enriched drink successfully provided by the present invention comprises a soybean milk drink or a milk drink which contains colloidal microcrystalline cellulose and low-strength agar, in such amounts as not to exceed a viscosity of 40 cp (centipoise), and an edible and hardly soluble calcium compound in a homogeneously dispersed state.

DETAILED DESCRIPTION OF THE INVENTION

In a typical case, this calcium-enriched drink contains not more than 0.15% by weight, in terms of calcium, of the hardly soluble calcium compound; from 0.1 to 0.3% by weight of the colloidal microcrystalline cellulose; and from 0.01 to 0.05% by weight of the low-strength agar. Further, the content of the low-strength agar is from 0.1 to 0.4 times by weight as much as the content of the calcium.

This calcium-enriched drink is produced by adding a microcrystalline cellulose/water soluble polymer complex and low-strength agar, in such amounts as not to exceed a viscosity of 40 cp, and a hardly soluble calcium compound to an arbitrary soybean milk drink or milk drink, homogenizing the obtained mixture and then sterilizing the same by heating.

The term "microcrystalline cellulose" as used herein means an aggregate of cellulose crystals which are obtained by hydrolyzing a highly pure wood pulp with an acid or an alkali and which have substantially a constant degree of polymerization (see, Industrial and Engineering Chemistry, vol. 42,502–507). The "microcrystalline cellulose/water soluble polymer complex" is prepared by coating the surface of the colloidal microcrystalline cellulose with a water soluble polymer, such as locust bean gum, guar gum, carrageenan, xanthan gum, carboxymethylcellulose sodium salt, soluble starch, dextrin or cyclodextrin, followed by drying (for example, the commercially available product AVICEL® RC Type (manufactured by Asahi Chemical Industry Co., Ltd.) corresponds thereto). During the drying step, the formation of hydrogen bonds among microcrystalline cellulose particles is inhibited by the water soluble polymer. Thus, when the complex is poured into water, a colloidal dispersion is readily obtained.

The term "low-strength agar" as used herein means a material prepared by dehydrating polysaccharides from common agar. In a 1.5% solution, common agar shows a jelly strength of about 400 to 900 $g/cm^2$. In contrast, low-strength agar shows a low jelly strength of about 30 to 200 $g/cm^2$ (the jelly strength is determined in accordance with NIKKAN method as described in Kaneo Hayashi and Akio Okazaki, *KANTEN HANDBOOK*, pp. 333–335 (1990). To determine the jelly strength of a 1.5% agar solution, the solution is prepared and allowed to stand at 20° C. for 15 hours to thereby form a gel. The maximum bearable load ($g/cm^2$ of the surface of the gel for 20 seconds) is regarded as the jelly strength. The product, Ultra Kanten (low gel strength agar) (manufactured by Ina Shokuhin Kogyo K.K.) may be cited as a commercially available product.

The drink of the present invention, which comprises a soybean milk drink or a milk drink containing colloidal microcrystalline cellulose and low-strength agar at definite ratios together with a hardly soluble calcium compound, does not form any precipitation or undergo deterioration in texture, even though the calcium content is elevated to a high level of, for example, 0.1 to 0.15% by weight. Because the present invention contains colloidal microcrystalline cellulose and low-strength agar, it has a somewhat high viscosity. However, the viscosity never exceeds 40 cp and thus, the calcium-enriched drink is not largely different from the basic drink in taste or texture.

The mechanism of that stabilizes the hardly soluble calcium compound in the drink of the present invention is unknown. However, it is known that both colloidal microcrystalline cellulose and low-strength agar exert synergistic effects as dispersion aids. When employed alone, neither substance achieves a stable dispersion of a large amount of the hardly soluble calcium compound without resulting in serious deterioration of the taste and texture of the basic drink.

Now, a method for producing the calcium-enriched drink of the present invention will be described in greater detail.

The hardly soluble calcium compound to be used in production of the calcium-enriched drink of the present invention may be arbitrarily selected from among appropriate calcium compounds, such as calcium carbonate, which is a food additive, as well as eggshell calcium, milk serum calcium and calcium phosphate.

In regard to the microcrystalline cellulose/water soluble polymer complex, any of the commercially available products of AVICEL® RC Type as described above may be used.

As the low-strength agar, any low-strength agar having a jelly strength of from about 30 to 200 g/cm$^2$ may be used. For example, the commercially available product Ultra Kanten (low gel strength agar) as described above may be used.

As the basic drink to which these additives are added, a soybean milk drink or a milk drink can be used. These basic drinks are not particularly restricted. Also, the content of soybean milk or milk is not particularly restricted. Appropriate examples of the basic drink include soybean milks, modified soybean milks, soybean milk drinks and soybean protein drinks, as specified in Japanese Agricultural Standards, and milks and milk drinks, as specified in "Ordinance on Component Standards of Milk and Milk Products" (Ordinance No. 52 of the Ministry of Health and Welfare).

To produce the drink of the present invention from these materials, the hardly soluble calcium compound, the microcrystalline/water soluble polymer complex and the low-strength agar, each in an appropriate amount, are added to the basic drink and mixed therewith. These substances may be added in an arbitrary order. Upon mixing, the microcrystalline cellulose/water-soluble polymer complex and the low-strength agar are easily dispersed or dissolved in the basic drink. (In the case of the microcrystalline cellulose/water-soluble polymer complex, the water-soluble polymer is dissolved while the microcrystalline cellulose undergoes colloidal dispersion.)

The amount of the calcium compound can be arbitrarily determined so long as its content does not exceed about 0.15% in terms of calcium. Usually, it is acceptable that the amount thereof ranges from about 0.1 to 0.13%. The amount of the microcrystalline cellulose/water-soluble polymer complex and the low-strength agar required for the stabilization of the calcium compound vary depending on the content of the calcium compound but are regulated such that the viscosity of the product does not exceed 40 cp. In general, the amounts thereof are as follows.

Microcrystalline cellulose/water-soluble polymer complex: from 0.1 to 0.3% by weight based on the product, and preferably from 0.1 to 0.2% by weight based on the product, in terms of the microcrystalline cellulose.

Low-strength agar: from 0.1 to 0.4 times by weight as much as the calcium content; and from 0.01 to 0.05% by weight, preferably from 0.015 to 0.02% by weight, based on the product.

The mixture of these starting materials is further homogenized and sterilized by heating. Thus, according to this method, the calcium-enriched drink of the present invention is obtained.

The following examples are provided to further the present invention. It is to be understood, however, that the examples are for illustration only and are not intended as a definition of the limits of the present invention. All the percentages are by weight unless otherwise indicated.

EXAMPLE 1

Into 200 kg of water, heated to 70° C., were dissolved or dispersed 3.49 kg of calcium carbonate, used as a food additive, a microcrystalline cellulose/water-soluble polymer complex (Avicel RC591, microcrystalline cellulose content: 90%, amount: varied within a range of from 1.5 to 3.0 kg), low-strength agar (jelly strength: 30 g/cm$^2$, amount: varied within a range of from 0.1 to 0.6 kg), 20 kg of an isomerized sugar, 1.3 kg of sodium chloride, 0.6 kg of a MILK Flavor 027-3 (manufactured by KYOWA PERFUMERY CO., LTD.) and 753 kg of soybean milk (solid soybean component: 10%). Water was added thereto to make the total weight 1,000 kg. Then, the mixture was heated to 85° C. and stirred in a homomixer. Next, it was homogenized by applying a pressure of 150 kgf/cm$^2$. After the homogenization was completed, the mixture was sterilized by heating to 143° C. for 4 seconds. Thus, a calcium-enriched modified soybean milk containing 0.15% calcium, from 0.135 to 0.270% microcrystalline cellulose and from 0.01 to 0.06% low-strength agar was obtained.

The modified soybean milk samples obtained according to this Example were stored at 10° C. for 2 weeks. Then these samples were examined in regard to precipitation of calcium carbonate, taste, texture and viscosity. The results are given in Tables 1 to 5. As the data show, when the content of the low-strength agar was low, the calcium remained somewhat unstable. However, only a small amount of precipitate formed compared with the case where no low-strength agar or microcrystalline cellulose was added. On the other hand, when the content of the low-strength agar was elevated to 0.05%, a light agar smell became conspicuous, though the commercial value of the product was not affected thereby. A low-strength agar content of 0.06% produced a product with an obviously undesirable agar smell. In other cases tested, however, neither the taste nor the texture suffered from any change. These results indicate that by using the microcrystalline cellulose together with the low-strength agar in appropriate amounts, a large amount of calcium carbonate can be stably dispersed without resulting in serious deterioration of the properties or taste of the soybean milk drink.

TABLE 1

Low-strength agar content: 0.01% (0.067 times as much as Ca):

| Microcrystalline cellulose content (%) | Viscosity (cp) | Precipitation |
| --- | --- | --- |
| 0.135 | 25 | little |
| 0.180 | 31 | little |
| 0.225 | 37 | little |
| 0.270 | 38 | little |

TABLE 2

Low-strength agar content: 0.015% (0.1 times as much as Ca):

| Microcrystalline cellulose content (%) | Viscosity (cp) | Precipitation |
|---|---|---|
| 0.135 | 27 | very little |
| 0.180 | 33 | none |
| 0.225 | 38 | none |
| 0.270 | 39 | none |

TABLE 3

Low-strength agar content: 0.02% (0.13 times as much as Ca):

| Microcrystalline cellulose content | Viscosity (cp) | Precipitation |
|---|---|---|
| 0.135 | 28 | none |
| 0.180 | 33 | none |
| 0.225 | 38 | none |
| 0.270 | 39 | none |

TABLE 4

Low-strength agar content: 0.05% (0.33 times as much as Ca):

| Microcrystalline cellulose content (%) | Viscosity (cp) | Precipitation |
|---|---|---|
| 0.135 | 29 | none |
| 0.180 | 35 | none |
| 0.225 | 39 | none |
| 0.270 | 40 | none |

TABLE 5

Low-strength agar content: 0.06% (0.4 times as much as Ca):

| Microcrystalline cellulose content (%) | Viscosity (cp) | Precipitation |
|---|---|---|
| 0.135 | 31 | none |
| 0.180 | 36 | none |
| 0.225 | 41 | none |
| 0.270 | 42 | none |

COMPARATIVE EXAMPLE 1

The procedure of Example 1 was repeated, except that no low-strength agar was added, and thus calcium-enriched modified soybean milks containing 0.15% of calcium and from 0.135 to 0.360% of the microcrystalline cellulose were prepared.

Six modified soybean milk samples thus obtained were subjected to the storage test under the same conditions as those employed in Example 1. The results are shown in Table 6 below. Namely, although the stability of calcium carbonate could be improved by adding a large amount of microcrystalline cellulose, formation of a precipitate could not be completely inhibited. In addition, the texture seriously deteriorated due to a remarkable increase in viscosity.

TABLE 6

Addition of microcrystalline cellulose/water-soluble polymer complex alone

| Microcrystalline content (%) | Precipitation | Viscosity (cp) | Taste and Texture |
|---|---|---|---|
| 0.135 | ++ | 25 | less viscous, good texture |
| 0.180 | ++ | 30 | less viscous, good texture |
| 0.225 | + | 35 | less viscous, good texture |
| 0.270 | + | 40 | somewhat viscous, a little poor texture |
| 0.315 | + | 45 | viscous, unsuitable for commercial use |
| 0.360 | + | 50 | viscous, unsuitable for commercial use |

COMPARATIVE EXAMPLE 2

The procedure of Example 1 was repeated, except that no microcrystalline cellulose/water-soluble polymer complex was added, and thus calcium-enriched modified soybean milks containing 0.15% of calcium and from 0.005 to 0.025% of the low-strength agar were prepared.

Five modified soybean milk samples thus obtained were subjected to the storage test under the same conditions as those employed in Example 1. The results are shown in Table 7 below. Namely, calcium carbonate could be stabilized and a good taste and a good texture could be obtained by adding the low-strength agar alone in a sufficient amount. In this case, however, the soybean solid contents separated out into 2 layers, which seriously deteriorated the commercial value of the product.

TABLE 7

Addition of low-strength agar alone:

| Low-strength agar content (%) | Precipitation | Separation into 2 layers | Viscosity (cp) | Taste and Texture |
|---|---|---|---|---|
| 0.005 | ++ | − | 8 | good |
| 0.010 | ++ | + | 10 | good |
| 0.015 | + | + | 10 | good |
| 0.020 | + | + | 10 | good |
| 0.025 | − | + | 11 | good |

(Note: In Tables 6 and 7, the extent of each phenomenon is expressed as a symbol, i.e., − means "no", + means "yes" and ++ means "remarkable".)

EXAMPLE 2

To 220 kg of water at 70° C. was added 0.2 kg of low-strength agar (jelly strength: 100 g/cm$^2$), which was dissolved therein. Further, 1.3 kg of sodium chloride was dissolved therein. Next, 2.2 kg of calcium carbonate, used as a food additive (manufactured by Shiraishi Karusium), and 2.5 kg of a microcrystalline cellulose/water-soluble polymer complex (AVICEL® RC591) were added and dispersed therein. Further, 20 kg of an isomerized sugar and 0.75 kg of MILK FLAVOR 027-3 (manufactured by KYOWA PERFUMERY CO., LTD.) were added thereto. The thus obtained mixture was then added to 753 kg of soybean milk with a solid content of 10% (unmodified soybean milk) and mixed therewith. The resulting mixture was heated to 85° C. and homogenized at the same temperature under a pressure of 150 kgf/cm². Subsequently, the mixture was sterilized by heating to 143° C. for 4 seconds. Thus, a calcium-enriched modified soybean milk with a calcium content of 0.10% was obtained.

The product thus obtained contained 0.225% of colloidal microcrystalline cellulose, 0.02% of low-strength agar and 0.10% of calcium. After storing at 10° C. for 1 month, it did not precipitate any calcium carbonate or separate into two layers. Compared with a control product, which was prepared in the same manner but not enriched with calcium, the product of the present invention showed no difference in taste and texture.

EXAMPLE 3

The procedure of Example 2 was repeated, except that an appropriate amount of coffee extract was added as a flavor component. Thus, a calcium-enriched soybean milk containing 0.15% of calcium, 0.225% of microcrystalline cellulose and 0.02% of low-strength agar was produced.

After storing at 10° C. for 1 month, product obtained did not precipitate any calcium carbonate or separate into two layers. Also it had excellent taste and texture.

EXAMPLE 4 AND COMPARATIVE EXAMPLE 3

Into 200 kg of hot water at 70° C. was dissolved 0.2 kg or 0.5 kg of agar. Further, 0.8 kg of sodium chloride, 3.49 kg of calcium carbonate and 2.5 kg of a microcrystalline cellulose/water-soluble polymer complex (Avicel RC591) were added thereto, followed by stirring. Next, 20 kg of an isomerized sugar, 1.3 kg of sodium chloride, 0.6 kg of MILK FLAVOR 027-3 (manufactured by KYOWA PERFUMERY CO., LTD.) and 753 kg of soybean milk (solid content: 10%) were added thereto. Then, the total amount of the mixture was adjusted to 1,000 kg with water. The resulting mixture was then homogenized and heat sterilized in the same manner as described in the above Examples. The soybean milk drink (calcium content: 0.15%) thus obtained was then subjected to the storage test described in the above Examples (10° C., 1 week).

The above-mentioned storage test was carried out using low-strength agars and common agars having various jelly strengths. Tables 8 and 9 show the results. Although precipitation of calcium carbonate was not observed in any case, viscosity rose with increasing jelly strength of the agar and affected the taste and texture of the product. Although the samples containing low-strength agars (jelly strength: up to 200 g/cm²), each showed an increase in viscosity of an acceptable level, the one containing the common agar (jelly strength: 550 g/cm²) showed such a high viscosity that it was unsuitable as a drink.

TABLE 8

| Addition of 0.02% agar: | |
|---|---|
| Jelly strength of agar (g/cm²) | Properties of product |
| 30 | viscosity: 38 cp, no separation/precipitation, good flavor and texture |
| 100 | viscosity: 38 cp, no separation/precipitation, good flavor and texture |
| 200 | viscosity: 39 cp, no separation/precipitation, good flavor and texture |
| 550 (common agar) | viscosity: 44 cp, no separation/precipitation, highly viscous and unsuitable |

TABLE 9

| Addition of 0.05% agar: | |
|---|---|
| Jelly strength of agar (g/cm²) | Properties of product |
| 30 | viscosity: 39 cp, no separation/precipitation, light agar smell |
| 100 | viscosity: 39 cp, no separation/precipitation, light agar smell |
| 200 | viscosity: 40 cp, no separation/precipitation, light agar smell |
| 550 (common agar) | viscosity: 51 cp, no separation/precipitation, highly viscous and unsuitable |

EXAMPLE 5

To 390 kg of water at 70° C., 0.2 kg of low-strength agar (jelly strength: 30 g/cm²) was dissolved therein. Next, 3.7 kg of calcium carbonate, used as a food additive (CALCEED 3N-A, manufactured by CALCEED K.K.) and 2.5 kg of a microcrystalline cellulose/water-soluble polymer complex (AVICEL ® RC591) were added and dispersed therein. Further, 583 kg of cow's milk was added, followed by mixing. Furthermore, 20 kg of sugar and 0.6 kg of YOGULT FLAVOR B-70269 (manufactured by TAKASAGO CO., LTD.) were each added as a flavoring component. Then, the mixture was heated to 85° C., homogenized under a pressure of 200 kgf/cm², and then sterilized by heating to 143° C. for 3 seconds, to thereby achieve a calcium-enriched milk drink.

The thus obtained product contained 0.225% of colloidal microcrystalline cellulose, 0.02% of low-strength agar and 0.2%, in terms of calcium, of calcium carbonate. After storing at 10° C. for 1 month, it did not precipitate calcium carbonate or separate into two layers. Compared with a control product, which was prepared in the same manner but not enriched with calcium, the product of the present invention showed no difference in taste and texture.

As discussed above, according to the present invention, wherein a hardly soluble calcium compound is dispersed in a soybean milk drink or a milk drink by using a microcrystalline cellulose/water-soluble polymer complex and low-strength agar, each as a dispersion aid, the basic drink (i.e., the soybean milk or milk drink) can be easily enriched with calcium without taste or texture deterioration, thus giving a calcium-enriched drink with a high nutritive value.

While the invention has been described in detail and with reference to specific embodiments thereof, it will be apparent to one skilled in the art that various changes and modifications can be made therein without departing from the spirit and scope thereof.

What is claimed is:

1. A calcium-enriched drink comprising a soybean milk drink or a milk drink which comprises colloidal microcrystalline cellulose and low-strength agar, each in an amount not to exceed a viscosity of 40 cp in the soybean milk drink or milk drink, and an edible and hardly soluble calcium compound in a homogeneously dispersed state, wherein the low-strength agar has a jelly strength of about 30 to 200 $g/cm^2$.

2. A calcium-enriched drink as claimed in claim 1 which comprises not more than 0.15% by weight, in terms of calcium, of the hardly soluble calcium compound; from 0.1 to 0.3% by weight of the colloidal microcrystalline cellulose; and from 0.01 to 0.05% by weight of the low-strength agar.

3. A calcium-enriched drink as claimed in claim 1 or 2 which comprises from 0.1 to 0.4 times by weight as much low-strength agar as calcium.

4. A method for producing a calcium-enriched drink which comprises:

(A) adding to a soybean milk drink or a milk drink a microcrystalline cellulose/water soluble polymer complex and low-strength agar, each in an amount not to exceed a viscosity of 40 cp in the soybean milk drink or milk drink, and adding a hardly soluble calcium compound to obtain a mixture, and (B) homogenizing the mixture obtained in (A), and then (C) sterilizing the same by heating to obtain the calcium-enriched drink.

5. The method according to claim 4, wherein the calcium-enriched drink comprises not more than 0.15% by weight, in terms of calcium, of the hardly soluble calcium compound; from 0.1 to 0.3% by weight of the colloidal microcrystalline cellulose; and from 0.01 to 0.05% by weight of the low-strength agar.

6. The method according to claim 4, wherein the calcium-enriched drink comprises from 0.1 to 0.4 times by weight as much low-strength agar as calcium.

7. The method according to claim 4, wherein the low-strength agar has a jelly strength of about 30 to 200 $g/cm^2$.

8. The method according to claim 4, wherein the colloidal microcrystalline cellulose comprises an aggregate of cellulose crystals which are obtained by hydrolyzing a highly purified wood pulp with an acid or an alkali.

9. The method according to claim 4, wherein the hardly soluble calcium compound is selected from the group consisting of calcium carbonate, eggshell calcium, milk serum calcium and calcium phosphate.

10. The method according to claim 4, wherein the calcium-enriched drink comprises 0.1 to 0.13% by weight, in terms of calcium, of the hardly calcium compound; from 0.1 to 0.2% by weight of the colloidal microcrystalline cellulose; and from 0.015 to 0.02% by weight of the low-strength agar.

11. A calcium-enriched drink as claimed in claim 1 or 2, wherein the colloidal microcrystalline cellulose comprises an aggregate of cellulose crystals which are obtained by hydrolyzing a highly purified wood pulp with an acid or an alkali.

12. A calcium-enriched drink as claimed in claim 1 or 2, wherein the hardly soluble calcium compound is selected from the group consisting of calcium carbonate, eggshell calcium, milk serum calcium and calcium phosphate.

13. A calcium-enriched drink as claimed in claim 1 or 2, which comprises 0.1 to 0.13% by weight, in terms of calcium, of the hardly soluble calcium compound; from 0.1 to 0.2% by weight of the colloidal microcrystalline cellulose; and from 0.015 to 0.02% by weight of the low-strength agar.

14. The calcium-enriched milk drink as claimed in claim 1, wherein said drink is a soybean milk drink.

* * * * *